United States Patent Office 2,754,155
Patented July 10, 1956

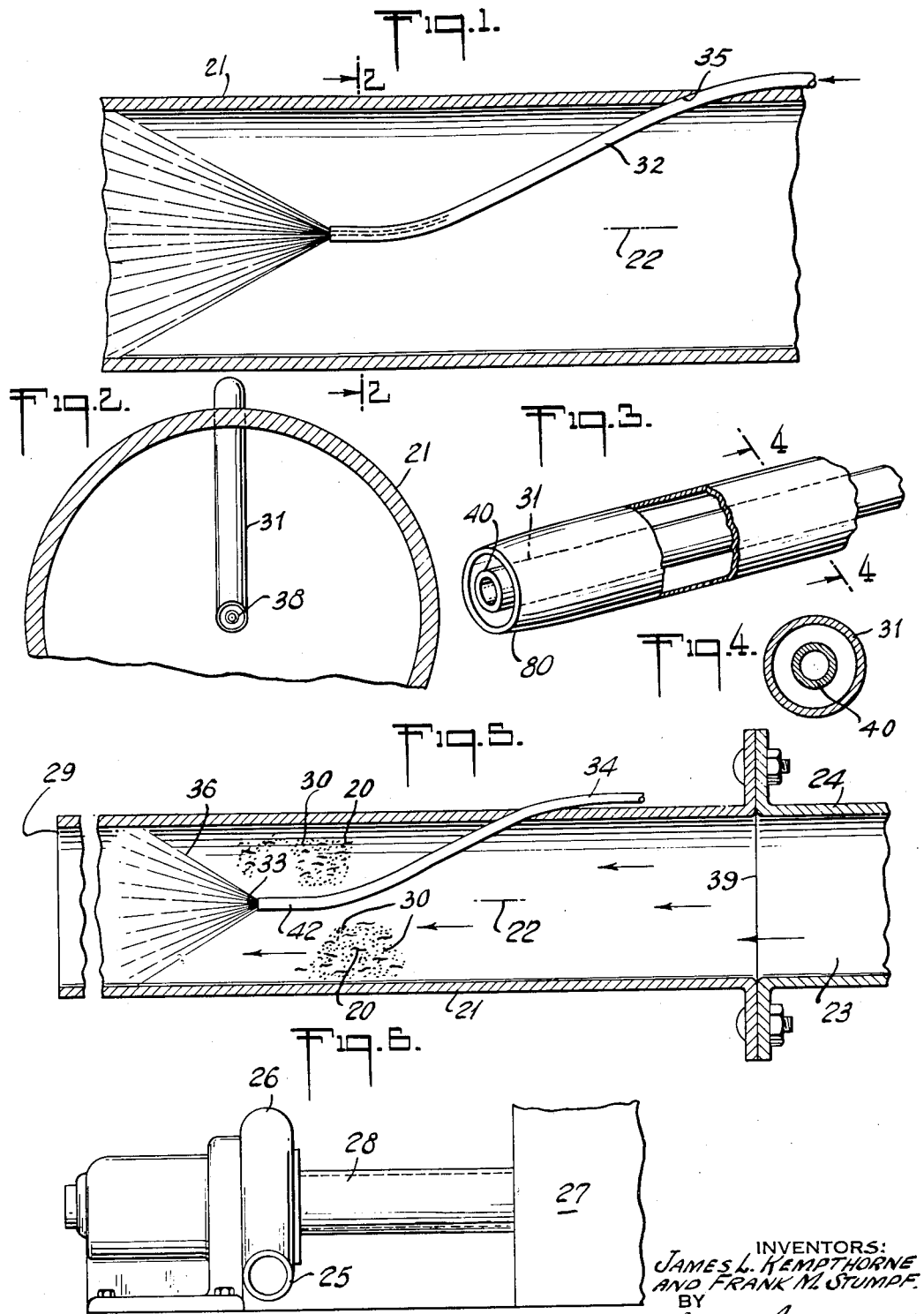

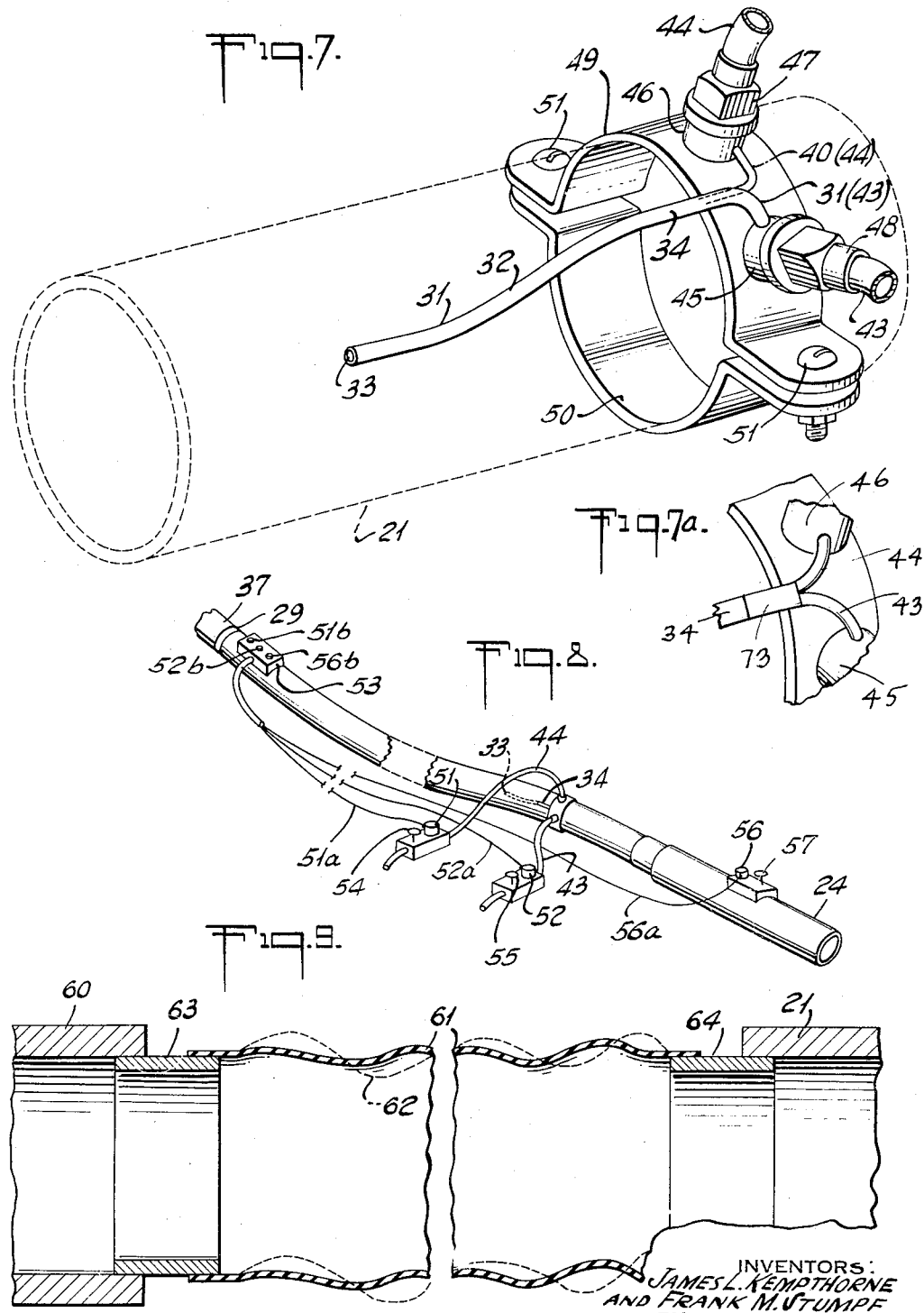

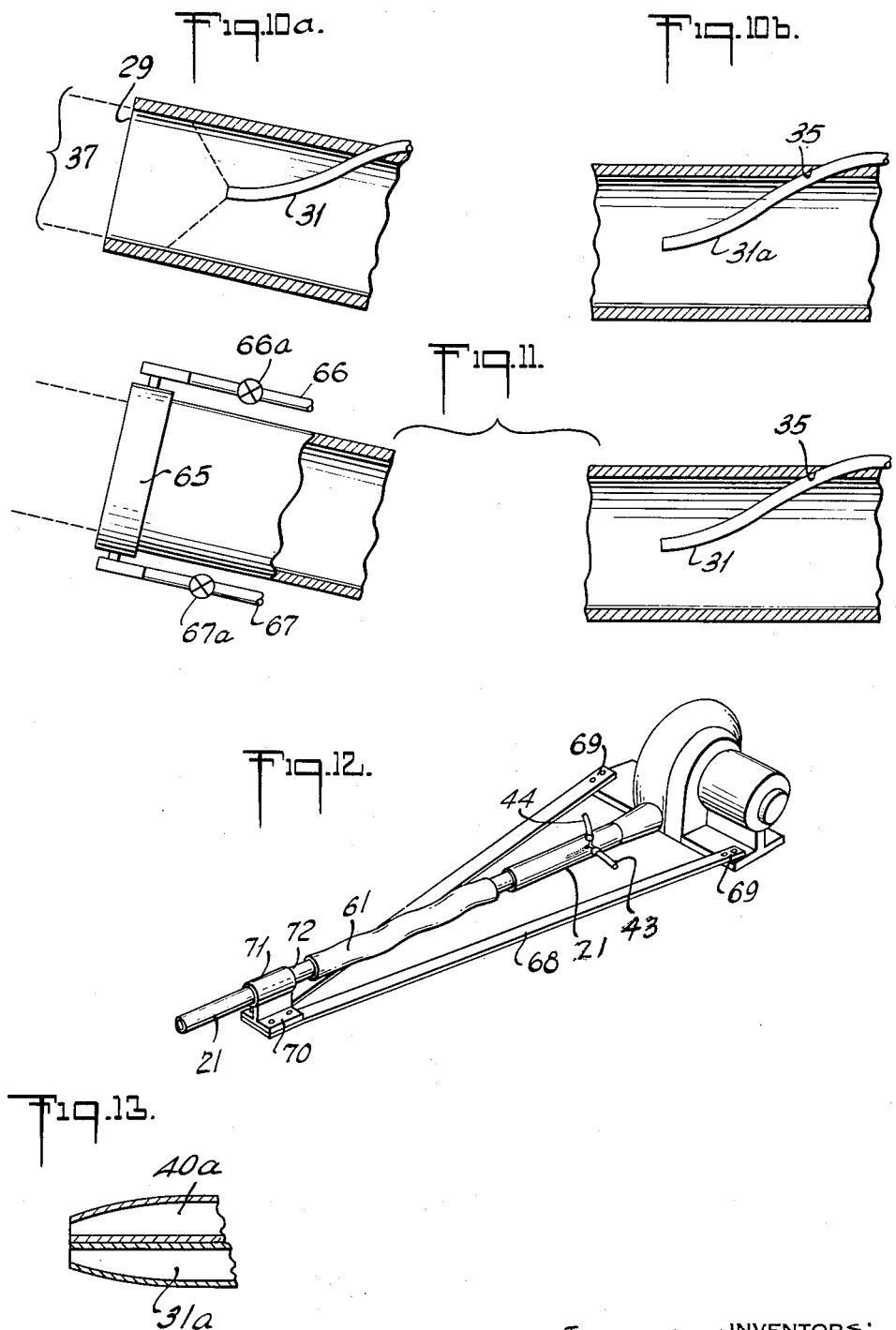

2,754,155

APPARATUS FOR USE IN PNEUMATIC SPRAYING OF LIGHTWEIGHT PARTICLES THROUGH A CONVEYOR HOSE

James L. Kempthorne and Frank M. Stumpf, Elizabeth, N. J.; said Stumpf assignor to United States Mineral Wool Company, Borough of Stanhope, N. J., a corporation of New Jersey Application April 25, 1955, Serial No. 503,458

6 Claims. (Cl. 302—20)

This invention relates to the art of spraying materials, such as lightweight particles, pneumatically. When such lightweight particles—as, for example, granulated and powdered particles, light fibers and the like, are pneumatically propelled through a conveyor hose and out of the discharge end thereof, they tend to "funnel" or "flower out," making it difficult for the operator to direct said materials to the point desired; much wastage also occurs. Such particles, being light in weight are inherently dusty or dust-generating. In fact, so much dust is normally encountered in pneumatic spraying of lightweight particles that the dust problem is a serious health hazard and production problem and has considerably hampered the use of the pneumatic conveyor system for spraying particles in many applications for which it would be otherwise well suited.

Other devices proposed in the prior art were found wanting as they were bulky and awkward, clogged easily, created undesirable effects such as venturi effects or "dead" spots, allowed "building up" of the material being conveyed, disturbed or stopped atomization, and proved unreliable and only spasmodically operative.

The present invention overcomes these and other deficiencies of the prior art by providing a novel apparatus and method for use in pneumatic spraying of lightweight particles through a conveyor, more particularly described below, and illustrated in the accompanying drawings.

In the drawings:

Fig. 1 is a fragmentary sectional view of a conveyor hose provided with an apparatus embodying the invention.

Fig. 2 is an enlarged transverse sectional view thereof, taken on line 2—2 of Fig. 1, Fig. 3 is an enlarged, partly sectional view of a tube embodying the invention, one end of which may be disposed in the conveyor hose pursuant to the invention, Fig. 4 is a transverse sectional view thereof, taken on line 4—4 of Fig. 3.

Fig. 5 is a partly fragmentary, longitudinal sectional view of a conveyor hose embodying the invention, shown coupled to a source of pneumatic feeding of particles thereinto, Fig. 6 is an illustrative fragmentary elevational view of one of many means useful for pneumatic feeding of lightweight particles into a conveyor, which may be used in connection with the invention, Fig. 7 is a schematic perspective view, showing a pneumatic conveyor hose (in dotted lines) provided with an apparatus embodying the invention, Fig. 7a is a similar but fragmentary view of another form thereof, Fig. 8 is a perspective view of a conveyor hose embodying the invention, showing a form of valve control mechanism which may be used in conection therewith, Fig. 9 is a partly broken, fragmentary longitudinal sectional view of a form of the invention wherein a length of highly flexible tubing is inserted into the conveyor hose, Fig. 10a is a fragmentary, sectional, schematic view, showing the manner in which the invention may be applied at the discharge end of a conveyor hose, and Fig. 10b is a fragmentary sectional view, illustrating the manner in which another unit, at another point of the conveyor may be used, in addition thereto, Fig. 11 is a fragmentary, partly elevational and sectional view, illustrating the manner in which the invention may be used in connection with a conveyor hose having a conventional moistening apparatus associated with the discharge end thereof, Fig. 12 is a fragmentary perspective view illustrating a form of the invention including a section of highly flexible tubing (shown also in Fig. 9) in the length of conveyor hose, and Fig. 13 is a fragmentary sectional view of the end portion of another form of device embodying the invention.

As shown in the drawings, the apparatus of the invention is adapted for use in pneumatic spraying of lightweight particles as, for example, the particles 20 (Fig. 5) through a conveyor such as hose 21, said hose having an end 39 for coupling to a source 23 of pneumatic feeding of said particles into said end of the hose under inertia urging said particles to flow through the hose in a direction parallel to longitudinal axis 22 thereof. The source 23 of pneumatic feeding of the particles may be a conduit 24 connected to or containing any suitable source of supply of particles 20 under pneumatic pressure; as shown in one example (Fig. 6), the source 24 may be the outlet end 25 of a blower 26 which draws particles from a suitable source 27 connected to the blower 26 by pipe 28 or the like. Source 23 may be any suitable source which supplies particles under pneumatic pressure and feeds them into the end 39 of hose 20 under inertia urging them to flow through the hose and out of the discharge end 29 thereof (Figs. 5, 10a, 11). Pursuant to the present invention, the particles will be so discharged in a straight line (stream 37 of Fig. 10a) in the plane in which said end of the hose is directed by the operator. The hose 21 may be made of any suitable material—for example, of a material of relatively inherent rigidity so as to maintain its cross-sectional outline while the particles are fed therethrough pneumatically.

Lightweight particles lack stability in flowing, and are dusty in nature (as noted at 30, Fig. 5) so that, on discharge from the hose, they seriously contaminate the air in the area in which the particles are sprayed. This has heretofore presented a substantial deterrent to use of such equipment and presented an occupational hazard, endangering the health of workmen, reducing the efficiency of the operation and creating considerable opposition to the use of the pneumatic conveyor system for spraying lightweight particles in many installations wherein it otherwise would have been highly desirable.

Pursuant to the present invention, these objections are overcome by the provision of a novel apparatus, including an elongated tube 31 (Fig. 7), preferably medially bent as at 32 so as to dispose its opposite ends 33, 34 in offset relation (Figs. 5 and 7). The tube is preferably bent longitudinally to define the outline of a very gradual S, as shown in the drawings—a form found to be particularly suited for carrying out the invention; the invention, however, is not limited to the specific form of tube 31. The end 34 of the tube is adapted to be mounted exteriorly of the hose, with the bent and streamlined portion 32 of the tube (Fig. 1) passing through an aperture 35 in the hose. The tube is so proportioned that the end 33 opposite the mounted end 34 will be disposed in the hose and directed toward the discharge end of the hose. Gas and liquid lines 43, 44 are connected to the mounted end 34 of the tube 31 (Fig. 7), whereby liquid under pressure may be connected to the tube exteriorly of the hose, to provide a spray 36 internally of the hose and directed toward the discharge end thereof, in the path of movement of the particles 20 through the hose. Said particles 20, in flowing into the spray internally of the hose (Fig. 5) will be pre-wet thereby; the dust condition is eliminated and the particles then adhere to projected straight lines on discharge from the hose and to the point toward which said discharge end of the hose is directed by the operator (37, Fig. 10a).

The end 33 of the tube 31 disposed in the hose 21 is preferably (Fig. 2) disposed in substantially the cross sectional center 38 of the hose 21.

If desired, the gas and liquid lines 43, 44, may be connected directly to the end 34 of the tube 31 as in Fig. 7 or to a Y or other fitting such as shown at 73, Fig. 7a, said fiitting in turn being connected to the end 34 of tube 31. As shown in Figs. 3 and 7, a second tube 40 may be provided entering the end 34 of tube 31 as shown in dotted lines, Fig. 7, or extending from that point to the very end 33 of tube 31, as shown in Fig. 3 or to any intermediate point. As shown in Fig. 13, one tube 31a, may be disposed outside or apart from the other, 40a. Tubes 31 and 40 (Fig. 7) or the fitting 73 of Fig. 7a may be connected exteriorly of the hose with the gas and liquid lines for the liquid to be sprayed under pressure.

If desired, the discharge end 33 of tube 31 may be formed as a straight section 42 (Fig. 5) parallel to the longitudinal axis 22 of the hose; in the form shown in Fig. 3, both tubes 31 and 40 are formed with straight sections at the discharge end 33. If the discharge ends of the tubes 31 and 40 are in registry (as in Fig. 3) very favorable results are attained, but tube 40 may, as above noted, be of lesser length than tube 31, if desired. Where two tubes 31, 40 are used in carrying out the invention, they may be connected exteriorly of the hose to gas and liquid lines 43, 44, which may be coupled to said tubes by the use of any desired or convenient means, such as by connecting the ends of said tubes to coupling sections 45, 46 (Fig. 7) for engagement with complementary coupling member sections 47, 48 to which the gas and liquid lines 43 and 44 may be connected. The opposite ends (not shown) of the gas and liquid lines may be respectively connected to an air compressor or compressed air system and to a source of supply of water under pressure, or to a conventional water supply faucet. The inner tube (40) may either be the liquid tube or gas tube; the outer tube being correspondingly either the gas or liquid tube. The coupling sections, 46, 45 and tubes 40, 31 may (Fig. 7) be fixed to a bracket 49 to which a separable section 50 may be connected by bolts 51 or the like, to facilitate clamping said bracket to the hose 21. Relative dimensions of the parts may be approximately those shown in Fig. 7 in a form found suitable for practicing the invention. In such proportions, tubes 40 and 31 are of fine size and self-cleaning. The outer tube may be tapered (as at 80, Fig. 3) toward the end 29 of hose 21 if desired to enhance the streamlined, self-cleaning action.

The tube 31 may be mounted adjacent the point of pneumatic feeding of the particles into the end 39 of hose 20, as shown in Fig. 5, or may be mounted adjacent the discharge end 29 of said hose as shown in Fig. 10a. Likewise the tube 31 as shown in Fig. 10a, may be used solely for pre-wetting the particles, or it may be used in association with a second tube, 31a, shown in Fig. 10b, of similar structure and corresponding with the tube 31 in the details above described and positioned in the hose intermediate the discharge end 29 thereof and the intake end 39 thereof. Or, as shown in Fig. 11, the tube 31 may be positioned in the hose intermediate its ends 29, 30 and used in association with a conventional type of hose nozzle 65 provided with conventional water and air lines 66, 67 controlled by valves 66a, 67a.

The present invention may be used to add various liquids, such as oil, water, binding agents, coloring agents and catalytic agents, to particles pneumatically sprayed.

Suitable controls may be provided for the apparatus, such as, for example, to provide for the flow of air or other gas through the tube 43 continuously while the source 23 of pneumatic feeding of the particles is operative. Thus, for example, in the case of a pneumatic feeding system such as shown in Fig. 6, the gas line 43 may be controlled so as to operate continuously while the particles are fed from the hopper 27 and through the discharge end 25 of the blower 26. This expedient is found convenient to avoid any possible fouling of the discharge end 33 of the tube 31 by any residue or small amounts of liquid which might otherwise collect at or flow out of the discharge end 33 of the tube 31 after the shutting off of the liquid supply, whereupon, on resuming the pneumatic feeding of particles the latter might adhere to and contaminate the discharge end 33 of tube 31 and build up on areas of the hose upon which the liquid drained. Hence, in accordance with this invention the gas line 43 is preferably operated essentially continuously or for a predetermined length of time after cutting off of the liquid line 44 and the particle source 23, and likewise in advance of their being turned on again.

To facilitate control by the operator for the above and other reasons, an electric valve such as solenoid valve 51 for control of the liquid line 44 may be provided, and an electric valve such a solenoid 52 for the control of the gas line 43 may be provided. Said solenoids may be connected, as by the wires 51a and 52a with suitable buttons 51b and 52b in a switch unit or means 53 which may be mounted on the hose at the discharge end thereof (Fig. 8). Hand actuated valves 54, 55 may be provided for said liquid and gas lines 44 and 43. The operator is thus enabled to control and regulate the relative flow and ratio of gas to liquid internally of conveyor hose 21, thereby predetermining the degree of pre-wetting of the particles 20 pursuant to the invention.

An electric valve, such as a solenoid 56 (Fig. 8), may be provided to control the source 23 of pneumatic feeding of the particles; said solenoid may be connected, as by wire 56a with switch 53, having a button 56b for the said solenoid, and a hand actuated valve 57 may be provided to further control the flow of particles from source 23.

The hose 21 is preferably of relatively inherent rigidity so as to maintain its cross-sectional outline while particles are fed therethrough pneumatically. A length of hose 60 (Fig. 9) of corresponding rigidity may be provided spaced from hose 21 (hose 21 may be out to provide the second section 60) and a length of highly flexible tubing 61 may be secured intermediate said sections 60 and 21 of conveyor hose 21. Said length of highly flexible tubing 61 is preferably made of very thin material such as rubber, so as to be flexible and substantially less rigid than the hose sections, and cross sectionally unstable during the pneumatic feeding of particles 20. The flexible tubing 61 will thus tend to flex and move during such feeding, as indicated by the dotted line 62 (Fig. 9) to thereby counteract any tendency of the particles to build up in flowing through the tubing and to break up any build-up. The workmen can, by squeezing tubing 61 if necessary, supplement its action. To facilitate securing the tubing 61 between the sections of hose, rigid collars may be provided as noted at 63, 64, and said tubing and hose sections may be connected thereto as shown in Fig. 9.

The flexible tube 61 may be introduced for several reasons: If the particle feed rate decreases, excessive liquid may cause particles to stick to the side; if the particle flow temporarily stops due to running out of material, sticking may again occur. In such cases, the flexible tube will tend to be self cleaning, or can be squeezed or easily removed for cleaning.

If desired, a rigid frame 68 may be provided for use in connection with flexible tube 61. Said frame may be fixed as at 69 adjacent the point of pneumatic feeding of the particles into the end 39 of the hose 21 and having a free end 70 remote therefrom, thereby safeguarding tubing 61 from being folded responsive to manipulation of the hose by the operator. A flange 71 may be provided at the free end 70 of frame 68, having a rigid collar 72 for connection of the flexible tubing 61 therewith, as shown in Fig. 12.

Having thus described our invention, what we claim as new and desire to secure by Letters Patent is:

1. An apparatus for use in pneumatic spraying of lightweight particles through a conveyor hose, said hose having a discharge end opening into the ambient atmosphere and having a second end for coupling to a source of pneumatic feeding of said particles into said hose under inertia urging said particles to flow through the hose parallel to the longitudinal axis of the hose, and out of the opposite, discharge end, of the hose directly into the ambient atmosphere at the end of the hose and in the plane to which said end of the hose is directed, said apparatus comprising an elongated tube bent so as to dispose its opposite ends in offset relation, one end of said tube being adapted to be mounted exteriorly of the hose, with the bent portion of the tube passed through an aperture in the hose, said tube being so proportioned and bent that the end thereof opposite the so mounted end will be disposed in the hose and directed toward the discharge end of the hose, whereby liquid may be connected to the tube exteriorly of the hose to provide a spray internally of the hose and directed toward the discharge end thereof, in the path of movement of the particles through the hose, so that said particles, in flowing into said spray internally of the hose, will be pre-wet thereby, and will therefore adhere to a projected line on discharge from the hose and toward the point to which the discharge end of the hose is directed, and the setting up and carrying of dust beyond the spray end of the tube in said hose and out of the discharge end of the hose will be essentially eliminated.

2. In an apparatus as set forth in claim 1, said hose being of relatively inherent rigidity so as to maintain its cross-sectional outline while said particles are so fed through the hose, a second length of hose of corresponding rigidity spaced from the first-mentioned hose, and a length of highly flexible tubing secured to said second and first-mentioned hose sections, said tubing being of substantially less rigidity than the hose sections and being cross-sectionally unstable during said pneumatic feeding of the particles through the hose sections, whereby said flexible tubing will tend to flex and move during such feeding, to thereby counteract any tendency of the particles to build up in flowing through the flexible tubing.

3. An apparatus for use in the pneumatic spraying of lightweight particles through a conveyor hose, said hose having a discharge end opening into the ambient atmosphere and having a second end for coupling to a source of pneumatic feeding of said particles into said hose under inertia urging said particles to flow through the hose parallel to the longitudinal axis of the hose, and out of the opposite discharge end of the hose directly into the ambient atmosphere at that end of the hose and in the plane to which said end of the hose is directed, said apparatus comprising an elongated tube, one end of said tube being adapted to be mounted exteriorly of the hose, a portion of the tube passed through an aperture in the hose, said tube being so proportioned and disposed that the end thereof opposite the so mounted end will be disposed in the hose, directed toward the discharge end of the hose, and a second, open tube mounted within said first mentioned tube and co-extensive therewith, whereby air and water lines may be connected to the tubes exteriorly of the hose, to provide a spray internally of the hose, directed toward the discharge end thereof, in the path of movement of the particles through the hose, so that said particles, in flowing into said spray internally of the hose, will be pre-wet thereby, and will therefore adhere to a projected line on discharge from the hose and toward the point to which the discharge end of the hose is directed, and the setting up and carrying of dust beyond the spray end of the tube in said hose and out of the discharge end of the hose is essentially eliminated.

4. In an apparatus as set forth in claim 3, straight sections formed inwardly of the open ends of said tubes and disposed parallel to the longitudinal axis of the hose, said tubes being formed, intermediate said straight sections and the point of entry of said tubes into the hose, at an acute angle to the longitudinal axis of the hose.

5. In an apparatus as set forth in claim 3, said first mentioned tube being tapered toward the open end of the hose.

6. In an apparatus as set forth in claim 3, control means connected to said air and water lines exteriorly of the hose for the continuation of operation of the air line for a predetermined period after cutting off, and in advance of turning on, of the liquid line.

References Cited in the file of this patent

UNITED STATES PATENTS

| | | |
|---|---|---|
| 430,558 | Wyneken | June 17, 1890 |
| 1,792,590 | Kirk | Feb. 17, 1931 |
| 2,261,347 | Di Santo | Nov. 4, 1941 |
| 2,391,484 | Seymour | Dec. 25, 1945 |
| 2,568,499 | Hood | Sept. 18, 1951 |